Figure 1:
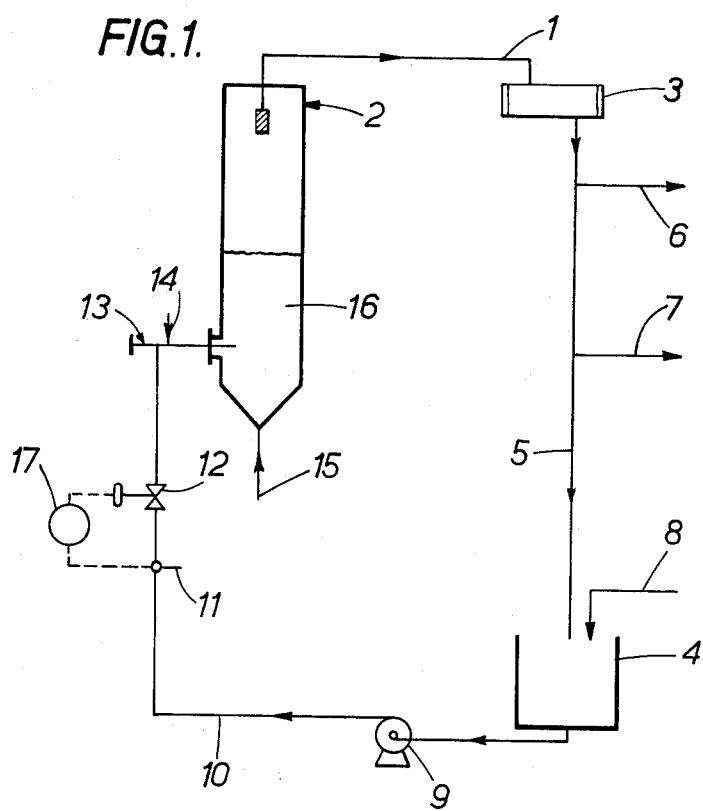

May 3, 1966  H. A. TAYLOR ETAL  3,249,400
PROCESSING OF FISSILE AND FERTILE MATERIAL FOR NUCLEAR REACTORS
Filed June 17, 1963  2 Sheets-Sheet 1

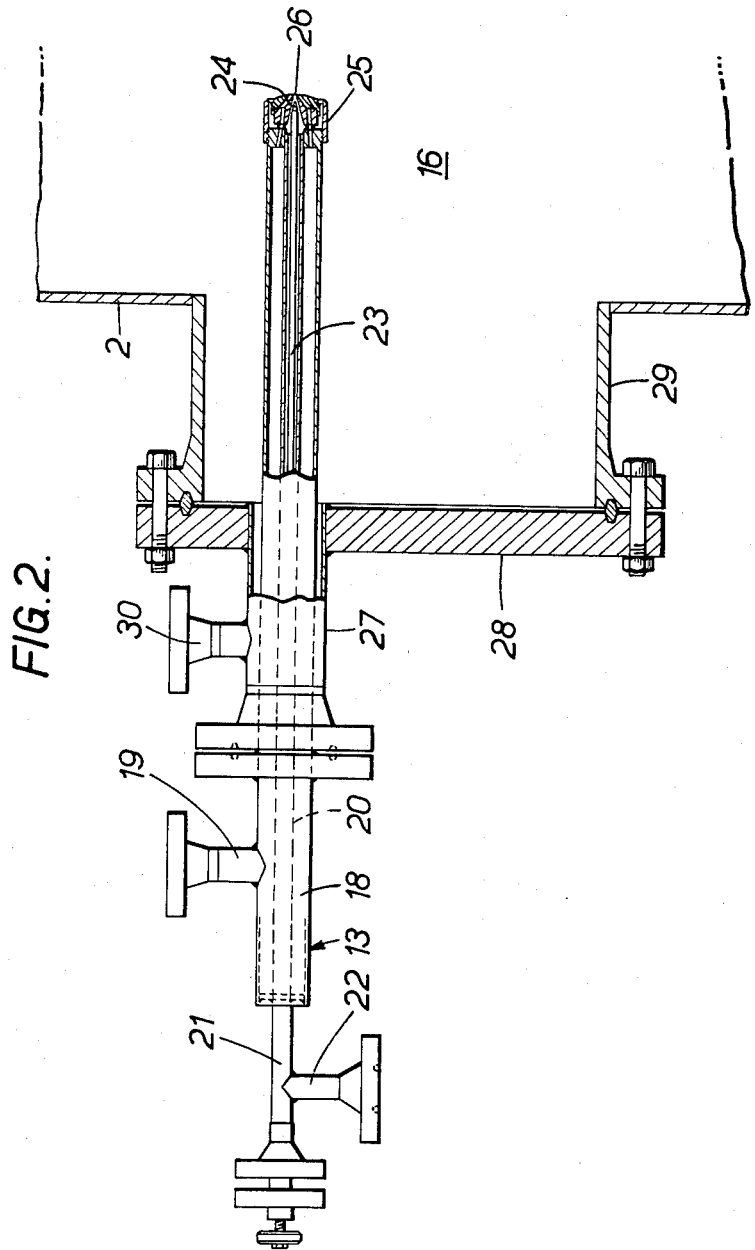

3,249,400
PROCESSING OF FISSILE AND FERTILE MATERIAL FOR NUCLEAR REACTORS

Herbert Arthur Taylor, Knutsford, and James Elgie Lloyd, Preston, England, assignors to United Kingdom Atomic Energy Authority, London, England
Filed June 17, 1963, Ser. No. 288,188
Claims priority, application Great Britain, June 20, 1962, 23,705/62
2 Claims. (Cl. 23—14.5)

This invention relates to the processing of fissile and fertile material for nuclear reactors and is particularly concerned with the process of hydrofluorinating uranium dioxide to produce uranium tetrafluoride.

Hydrofluorination of uranium dioxide in a fluidised bed is known. In one such process uranium dioxide powder is maintained in a fluidised state and converted to uranium tetrafluoride by passing anhydrous hydrofluoric acid vapour through the bed.

According to the invention, a process of hydrofluorinating uranium dioxide in which the uranium dioxide is maintained in a fluidised state in a fluidised bed reactor comprises the steps of; feeding a fluidising medium and a hydrofluoric acid vapour to the uranium dioxide, condensing the hydrofluoric acid off-gases diluted by the reaction and collecting the dilute hydrofluoric acid condensate; substituting a liquid feed of said dilute hydrofluoric acid condensate for said hydrofluoric acid vapour to the uranium dioxide at a first intermediate stage of the process before reaction is complete; and re-substituting the feed of said hydrofluoric acid vapour for said liquid feed of dilute hydrofluoric acid condensate at a second intermediate stage before the reaction is complete.

The introduction of dilute hydrofluoric acid as a liquid during the reaction affords a simple method of effecting economy in the use of hydrofluoric acid since some of the dilute hydrofluoric acid which is collected as the condensed off-gases from the reaction can be re-cycled for re-introduction, whereby an alternative method of re-cycling hitherto employed and which involves boiling and feeding as hydrofluoric acid vapour and which gave rise to severe corrosion problems, can be dispensed with. However, although the reaction is exothermic, because of corrosion difficulties with condensation, it is preferable to heat the bed in the early stages of the reaction and it is also preferable not to inject dilute hydrofluoric acid into the bed until the reaction is partially complete because of the cooling effect of the latent heat of evaporation which is absorbed from the bed. Furthermore, the duration of the reaction time is increased by use of dilute hydrofluoric acid instead of anhydrous hydrofluoric acid so that, for economic reasons, the injection should be limited to an intermediate period of the reaction. A suitable period of injection has been found to be between 45% and 70% of complete reaction of the uranium dioxide.

A process embodying the invention will now be described by way of example, with reference to the accompanying drawings, wherein:

FIGURE 1 is a line diagram, and
FIGURE 2 is a fragmentary side view partly in section of a vapour injecting device mounted in a reactor.

In the apparatus shown diagrammatically in FIGURE 1 a pipeline 1 connects a reactor 2 containing a bed 16 of uranium dioxide to a condenser 3. The condensate can be directed either to a stock tank 4, to disposal or to a distillation process by means of lines 5, 6 and 7 respectively. A pump 9 included in a pipeline 10 from the stock tank 4 delivers to reactor 2 via a flow meter 11, a control valve 12 controlled from a flow rate controller 17, and a spray injecting device 13. A pipeline 14 feeds nitrogen to the device 13 and nitrogen and/or hydrofluoric acid vapour can be passed into the reactor 2 via a pipeline 15. Dilute hydrofluoric acid is also delivered to the stock tank 4 from an external source such as distillation columns. In use to process a batch load of uranium dioxide the bed 16 is first fluidised by a mixture of nitrogen and anhydrous hydrofluoric acid vapour and the hydrofluoric acid reacts with the uranium dioxide to produce uranium tetrafluoride. The gases leaving the reactor (which comprise steam and hydrofluoric acid vapour) are condensed in the condenser 3 and the condensate is passed to the stock tank 4. When the reaction is approximately 45% complete the hydrofluoric acid vapour feed is cut off and dilute hydrofluoric acid from the stock tank is injected into the bed 16 via the spray injecting device 13. When the reaction is approximately 70% complete the supply of dilute hydrofluoric acid liquid is ceased and the anhydrous hydrofluoric acid vapour feed is restored via the pipeline 15. A typical uranium hydrofluorination batch quantity is 6½ to 7½ tonnes for which approximately 6 tonnes of anhydrous hydrofluoric acid vapour are required. The concentrate from the condenser 3 is dilute hydrofluoric acid solution of 20–25% concentration and 2½–3½ tonnes of hydrofluoric acid of 55% concentration is injected into the bed from the stock tank 4.

Referring now to FIGURE 2, there is shown a liquid hydrofluoric acid spray injecting device 13 comprising a flanged tubular member 18 having a branch pipe 19 and a coaxial inner member 20. The inner member 20 has an extension 21 having a branch 22. The member 20 houses a shaft 23 with a tapered end 24, the latter co-operating with an end fitting 25 of the member 18 to define a spray nozzle 26. The device is shown mounted in a branch pipe 27 attached to a cover 28 of a manhole 29, the nozzle 26 being disposed within the bed 16 in the reactor 2. The branch pipe 27 has a flanged connection 30 for introducing a nitrogen purge to the branch pipe 27.

In use liquid dilute hydrofluoric acid is fed from the tank 4 by the pump 9 to the branch 22 and passes down the annulus bounded by the member 20 and the shaft 23 to the nozzle 26. Pressurised nitrogen is admitted to the device at branch 19, passes to the nozzle 26 via the annulus bounded by the outer member 18 and the inner member 20, and projects a spray of liquid hydrofluoric acid into the bed 16.

We claim:
1. A process of hydrofluorinating uranium dioxide in which the uranium dioxide is maintained in a fluidised state in a fluidised bed reactor comprising the steps of feeding a fluidising medium and anhydrous hydrofluoric acid vapour to the uranium dioxide, condensing from the off-gases that part which consists of unused hydrofluoric acid and the steam produced by the reaction and collecting the dilute aqueous solution of hydrofluoric acid so produced, substituting a liquid feed of said dilute aqueous soltion of hydrofluoric acid for said anhydrous hydrofluoric acid vapour at a first intermediate stage of the process before reaction is complete, and resubstituting the feed of said anhydrous hydrofluoric acid vapour for said liquid feed of the dilute aqueous solution of hydrofluoric acid at a second intermediate stage before the reaction is complete.

2. A process according to claim 1, wherein said first and second intermediate stages are 45% and 70% of complete reaction respectively.

(References on following page)

References Cited by the Examiner

UNITED STATES PATENTS

| | | | |
|---|---|---|---|
| 1,377,479 | 5/1921 | Hansen | 239—416 |
| 1,504,443 | 8/1924 | Gibbons | 239—416 |
| 3,069,227 | 12/1962 | Vertes et al. | 23—14.5 X |
| 3,086,842 | 4/1963 | La Lande | 23—14.5 |
| 3,120,994 | 2/1964 | Brodsky et al. | 23—14.5 |

FOREIGN PATENTS

| | | |
|---|---|---|
| 232,926 | 5/1959 | Australia. |
| 629,295 | 10/1961 | Canada. |

OTHER REFERENCES

Lawroski et al.: Proceedings of the Second United Nations International Conference on the Peaceful Uses of Atomic Energy, 1958, vol. 4, pp. 47 and 48.

Levitz et al.: "Chemical Engineering Process," April 1957, vol. 53, No. 4, pp. 199–202.

LEON D. ROSDOL, *Primary Examiner.*

CARL D. QUARFORTH, L. DEWAYNE RUTLEDGE,
*Examiners.*

R. L. GRUDZIECKI, *Assistant Examiner.*